F. DOW.

LAMP BURNER.

APPLICATION FILED MAR. 18, 1915.

Reissued Nov. 23, 1915.

14,016.

Witnesses:

E. E. Gaylord.

Irvin C. Bowman.

Inventor:

Floyd Dow,

By Dyrenforth, Lee, Chritton and Wilkes,

Attys.

COLUMBIA PLANOGRAPH CO., WASHINGTON, D. C.

UNITED STATES PATENT OFFICE.

FLOYD DOW, OF WYANET, ILLINOIS, ASSIGNOR, BY DIRECT AND MESNE ASSIGNMENTS, TO THE SMOKELESS BURNER CO., OF CHICAGO, ILLINOIS, A CORPORATION OF ILLINOIS.

LAMP-BURNER.

14,016. Specification of Reissued Letters Patent. Reissued Nov. 23, 1915.

Original No. 1,121,175, dated December 15, 1914, Serial No. 859,358. Application for reissue filed March 18, 1915. Serial No. 15,329.

*To all whom it may concern:*

Be it known that I, FLOYD DOW, a citizen of the United States, residing at Wyanet, in the county of Bureau and State of Illinois, have invented a new and useful Improvement in Lamp-Burners, of which the following is a specification.

My invention relates to improvements in the class of burners for oil-burning lamps, employing a flat-wick burner surrounded by a profusely perforated disk for admitting air to support combustion, the tube registering with a central slot in the top of a cone fitting over the wick-tube and covering the perforations in the diaphragm.

The primary object of my invention is to provide means for conducting vapor-carrying air through the burner from the oil in the lamp-bowl to opposite sides of the flame to enhance the combustion, and this in a manner to balance the supply of such vapors to the flame at its opposite sides and without impairing the desirable balancing of the air-supply thereto through the perforated diaphragm.

Figure 1:
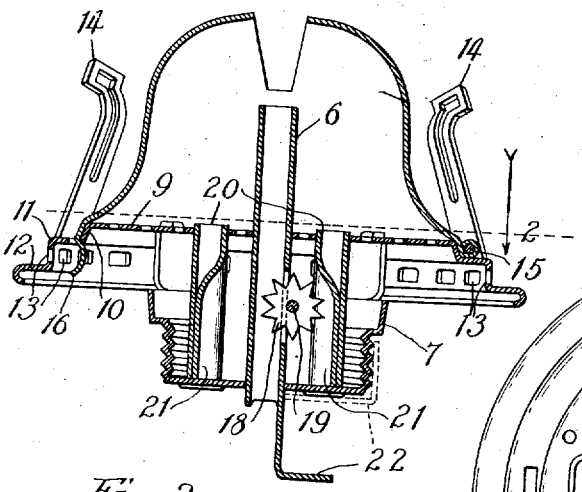
Figure 4:
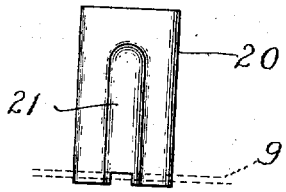
Figure 5:
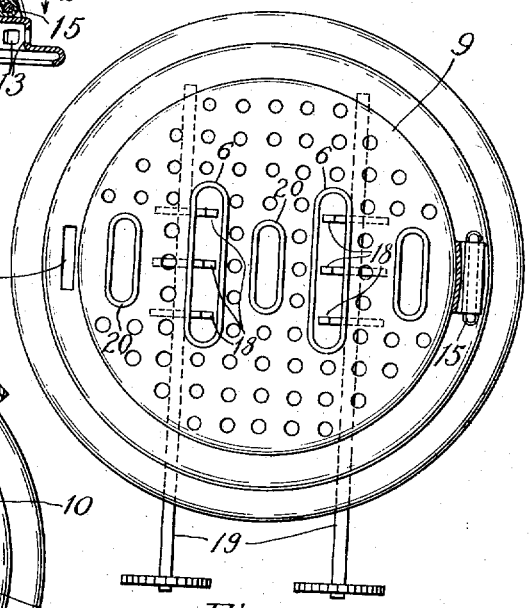
Figure 2:
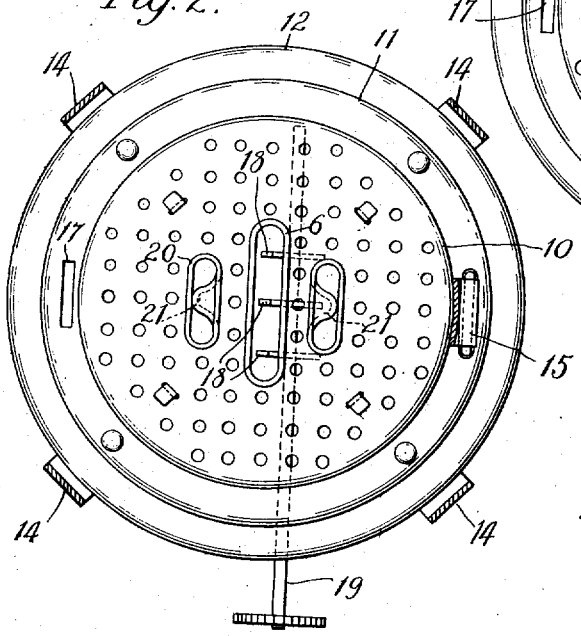
Figure 3:
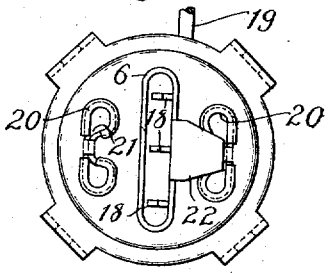

In the accompanying drawing, Figure 1 is a view in vertical sectional elevation of a lamp-burner embodying my improvements; Fig. 2 is a section on line 2, Fig. 1; Fig. 3 is a bottom plan view of the burner as shown in Fig. 1; Fig. 4 is a view of one of the vapor-ducts as employed in the burner illustrated in the preceding figures, and Fig. 5 is a view like that presented in Fig. 2 but illustrating a modified construction.

Referring particularly to Figs. 1 to 4, inclusive, a wick-tube 6 extends through the externally threaded burner-base 7 to register with the slot in the cone 8. This base carries a profusely perforated disk 9 provided with an annular shoulder at 10 and another at 11, in the vertical wall between which latter and the chimney-seat 12 are provided relatively large perforations 13 about the wall for the admission of air into the cone to supplement the air entering therein through the smaller perforations in the disk. Usual spring fingers 14 may be provided for holding a lamp-chimney (not shown) on its seat. The cone is shown to be hinged at 15 to the disk and to carry a spring tongue 16 diametrically opposite the hinge to enter a slot 17 for securing the cone releasably in its operative position. Toothed wheels 18, of which three are shown in Fig. 2 on a stem 19 journaled in the burner-base to extend transversely through it along one side of the wick-tube, work through an opening in a side of the tube for engaging the wick to raise and lower it by turning the stem.

As thus far described, the construction presents no features of novelty.

On opposite sides of the burner-tube extend parallel therewith and vertically through the base and through the disk 9, flat tubular ducts 20, 20, of lesser width than the tube 6. These ducts are spaced equidistant from the respective sides of the wick-tube, between which and each duct is a row of the relatively-small perforations in the disk. Both ducts are shown to have their inner walls bent between their lateral edges against the inner faces of their outer walls, toward the lower ends of the ducts, to form recesses 21. This enables the duct at one side of the wick-tube to clear the central wheel 18, which enters the adjacent recess; and the purpose of similarly forming the other duct is to render the ducts interchangeable, thus to avoid the need of selection in fitting them into place, and also to render the passages through them of uniform size, thereby to insure balancing the flow of fumes or vapors through them to the opposite sides of the burning wick.

By the foregoing construction the perforations in the top of the disk 9 are uniformly disposed entirely about the wick-tube, thereby insuring a uniform feed of combustion-supporting air to opposite sides and ends of the wick to produce even burning thereof and a wide and symmetrical flame. Heat from the burning wick conducted to the under side of the burner effects decomposition of the hydrocarbon oil in the lamp-bowl, generating fumes. These fumes pass through the ducts into the cone, which directs them to the flame, enriching the latter and enhancing the combustion of the fuel, with the advantages of augmenting its illuminating power and minimizing the odor of the burning lamp. By providing these similar ducts on opposite sides and in close proximity to the wick-tube, the feed of the fumes they carry is rendered uniform to opposite sides of the flame, thereby preventing uneven burning of the wick and causing a thorough and intimate mixture of the fumes with the body of the flame, thus materially enhancing the advantages referred to. Moreover, the spaces between the opposite sides of the wick-tubes and the ducts 20 enable air from the disk-perforations at both sides of each duct to mix with the fumes discharging from it and thus better prepare the mixture for combustion. This produces rapid and complete consumption of the inflammable and explosive gases and results in a bright flame giving a powerful and white light without smoke and disagreeable odor; and it enables the wick to be turned much higher than would be the case were the combustion of these gases less rapid and complete. Further advantages of the fume-ducts are due to the free circulation of air they admit to the surface of the oil in the lamp-bowl, whereby the oil is cooled, thus lessening the danger of explosion, and to the free escape of the gases to the flame, whereby the wick remains clean instead of becoming clogged and discolored as it does where such gases have to pass slowly through and around the wick.

The modification illustrated in Fig. 5 is a mere amplification of the described construction, to adapt the burner for large house-lamps, oil-stoves, oil-heaters, lanterns, automobile-lamps, and the like. It involves a duplication of the wick-tube 6 and of the wheel-carrying stem 19; and three of the ducts 20 are provided to bring each wick-tube between two of them, which latter do not in this case require to be crimped for producing the recesses 21, since in their positions the central toothed wheels clear them. Of course, in this modified construction, the cone contains two slots, one for each wick, but that feature is too obvious to require illustration.

In Figs. 1 and 3 a hooked finger 22 is shown as an extension depending from one side of the wick-tube. This affords means for holding the burner on the lamp-body when the burner is unscrewed and turned to one side to permit insertion into the mouth of the lamp-body of the nozzle of a can or of a funnel for filling the lamp. When the burner is thus turned to one side, the hook engages the collar-portion of the lamp-body and holds the burner in conveniently accessible position from which to re-screw it into place; and it avoids the necessity of holding the burner in one hand while performing the filling operation with the other, or of withdrawing the wick entirely with the burner and laying them down with resultant liability of the oil in the wick soiling the surface on which it is laid, and the liability to soil the hands of the person filling the lamp by contact with the wick. For packing the burner for shipment, the finger 22 may be bent to extend across the bottom of the base 6, as indicated in Fig. 1.

What I claim as new and desire to secure by Letters Patent is:—

1. In a lamp-burner, the combination of a base, a profusely-perforated disk secured to the base, a wick-tube extending through the base and disk, and similar fume-ducts having flat outer sides and rising through said disk at the opposite sides of the wick-tube in substantially parallel relation thereto.

2. In a lamp-burner, the combination of a base, a profusely-perforated disk secured to the base, a wick-tube extending through the base and disk, and fume-ducts leading through said base and disk at opposite sides of the wick-tube and spaced from the latter to extend along a line of perforations in the disk between said tube and each duct.

3. In a lamp-burner, the combination of a base, a profusely-perforated disk secured to the base, a wick-tube extending through the base and disk, a slotted cone for covering the wick-tube, means for raising and lowering the wick comprising a rotatable stem carrying a toothed wheel projecting through a side of said tube, and fume-ducts leading through said base and disk at opposite sides of the wick-tube and spaced from the latter to extend along a line of perforations in the disk between said tube and each duct, one of said ducts having a recess formed in its inner wall to receive said wheel.

FLOYD DOW.

In presence of—
C. W. McFerren,
Willis Hamrick.

Copies of this patent may be obtained for five cents each, by addressing the "Commissioner of Patents, Washington, D. C."